United States Patent
Desai et al.

(10) Patent No.: US 7,895,664 B2
(45) Date of Patent: Feb. 22, 2011

(54) DETERMINATION OF ACCESS CHECKS IN A MIXED ROLE BASED ACCESS CONTROL AND DISCRETIONARY ACCESS CONTROL ENVIRONMENT

(75) Inventors: Saurabh Desai, Austin, TX (US); Niteesh Kumar Dubey, Yorktown Heights, NY (US); Ravi A. Shankar, Austin, TX (US); Drew Thomas Walters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 11/742,099

(22) Filed: Apr. 30, 2007

(65) Prior Publication Data
US 2008/0271139 A1 Oct. 30, 2008

(51) Int. Cl.
*G06F 7/04* (2006.01)
*G06F 21/00* (2006.01)

(52) U.S. Cl. .............. 726/27; 726/2; 726/4; 726/17; 726/26; 726/28; 726/29; 726/30; 713/156; 713/157; 713/165; 713/166; 713/167; 713/182; 713/184; 713/185; 713/186; 709/225; 709/229

(58) Field of Classification Search ......... 713/182–186, 713/156, 157, 164–167; 726/26–30, 2, 4, 726/17; 709/225, 229
See application file for complete search history.

(56) References Cited

U.S. PATENT DOCUMENTS 7,185,192 B1 * 2/2007 Kahn ...................... 713/155
7,529,931 B2 * 5/2009 Vasishth et al. ............. 713/166
2002/0184535 A1 * 12/2002 Moaven et al. ............. 713/202
2005/0132215 A1 * 6/2005 Wang et al. ................. 713/200

OTHER PUBLICATIONS

U.S. Appl. No. 11/619,918, filed Jan. 4, 2007, Whitson.
Camillone et al., "Compatibility of Access Control Lists and Permission Bits in AIXv3", IBM Technical Disclosure Bulletin, Dec. 1991, pp. 127-129.
Camillone et al., "Extensible Access Control List Mechanism", IBM Technical Disclosoure Bulletin, Dec. 1991, pp. 114-117.

* cited by examiner

*Primary Examiner*—Taghi T Arani
*Assistant Examiner*—Madhuri Herzog
(74) *Attorney, Agent, or Firm*—Yee & Associates, P.C.; Matthew W. Baca

(57) ABSTRACT

A computer implemented method, apparatus, and computer program product for access control in a mixed discretionary access control and role based access control environment. In one embodiment, an execution access for a command is determined using a set of role based authorizations for a user invoking the command. In response to a determination that the user invoking the command is authorized based on the set of role based authorizations, a privilege in a set of privileges associated with the command is raised. Raising the privilege in the set of privileges bypasses discretionary access control checks. In response to a determination that the user invoking the command is unauthorized based on the set of role based authorizations, an execution access for the command is determined using a set of discretionary access mode bits associated with the command.

15 Claims, 4 Drawing Sheets

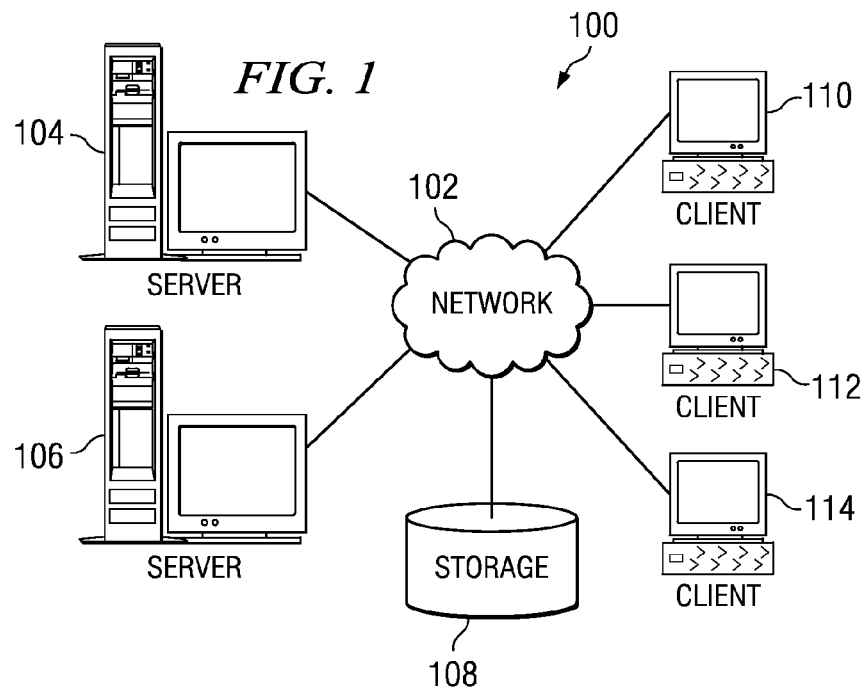

DETERMINATION OF ACCESS CHECKS IN A MIXED ROLE BASED ACCESS CONTROL AND DISCRETIONARY ACCESS CONTROL ENVIRONMENT

BACKGROUND OF THE INVENTION

1. Field of the Invention

The present invention is related generally to a data processing system and in particular to a method and apparatus for access control. More particularly, the present invention is directed to a computer implemented method, apparatus, and computer usable program code for dynamic determination of access control checks in a mixed role based access control (RBAC) and discretionary access control (DAC) environment.

2. Description of the Related Art

In a data processing system in which multiple different users access and execute operations, security and other access control measures may be necessary to prevent one or more users from accessing certain resources and/or executing certain operations. For example, an owner or creator of a file may wish to prevent other users from modifying the owner's file. Access controls are used to control which users have access to a file and what types of operations these users can perform on the file.

In traditional UNIX®, file execution and other operations can be controlled or restricted using discretionary access control (DAC) file mode bits. Discretionary access control permission is defined in accordance with the identity of the user or invoker of a command. A user or invoker may have an identity such as owner, member of a group, or other. Each file has read, write, and execute mode bits granting permission or authorization to perform read, write, or execute operations for a file owner, a group, and/or all others. These mode bits are known as discretionary access control mode. When a file is executed, this discretionary access control mode is checked against the invoker's credentials. If the invoker's credentials match the discretionary access control mode bits, then access is allowed. For example, the /usr/bin/ls command has permissions like, "-r-xr-xr-x bin bin/usr/bin/ls." This means any user can execute this command. The /usr/sbin/slibclean command has permissions like, "-r-x------root system /usr/sbin/slibclean," so only a root user can execute this command.

Unlike discretionary access control, role based access control (RBAC) defines access to command execution based on what authorizations the user has been assigned rather than basing access on the user's identity. In role based access control, a role consists of a set of authorizations. A role is assigned to one or more users. Multiple roles may be assigned to a single user.

Each of the roles in a role-based access control system has certain privileges and authorizations assigned to them which allow the users assigned to these roles to execute certain privileged programs or processes, and/or access privileged data. The authorizations in the role determine the command access available for the user.

When a role based access control framework is used in conjunction with a discretionary access control mechanism, a policy is designed that allows role based access control enforcement to occur while still honoring discretionary access control when required. Current solutions address the discretionary access control and role based access control interactions as an "AND" policy in that the invoker must succeed or be authorized under both the discretionary access control and role based access control mechanisms in order to execute a given command. Thus, the invoker must be authorized under the discretionary access control mode bits and be assigned to a role authorized to execute the given command.

To satisfy this requirement, the discretionary access control mode bits for role based access control restricted commands typically are modified to allow everyone access. The role based access authorizations for the command then determine the invoker's authorization to execute the command. However, changing mode bits to grant everyone access presents a potential security threat if the role based authorization restrictions are ever removed from the file. In this case, a user may be able to execute a privileged command that they should not be able to execute.

Additionally, all customers may not desire to use role based access control in their working environment. Thus, modifying the mode bits presents issues when trying to support both discretionary access control and role based access control enabled modes of operation.

SUMMARY OF THE INVENTION

The illustrative embodiments provide a computer implemented method, apparatus, and computer usable program code for access control in a mixed discretionary access control and role based access control environment. In one embodiment, an execution access for a command is determined using a set of role based authorizations for a user invoking the command. In response to a determination that the user invoking the command is authorized based on the set of role based authorizations, a privilege in a set of privileges associated with the command is raised. Raising the privilege in the set of privileges bypasses discretionary access control checks. In response to a determination that the user invoking the command is unauthorized based on the set of role based authorizations, an execution access for the command is determined using a set of discretionary access mode bits associated with the command.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network data processing system in which illustrative embodiments may be implemented;

FIG. 2 is a block diagram of a data processing system in which illustrative embodiments may be implemented;

DETAILED DESCRIPTION OF THE PREFERRED EMBODIMENT

Figure 3:
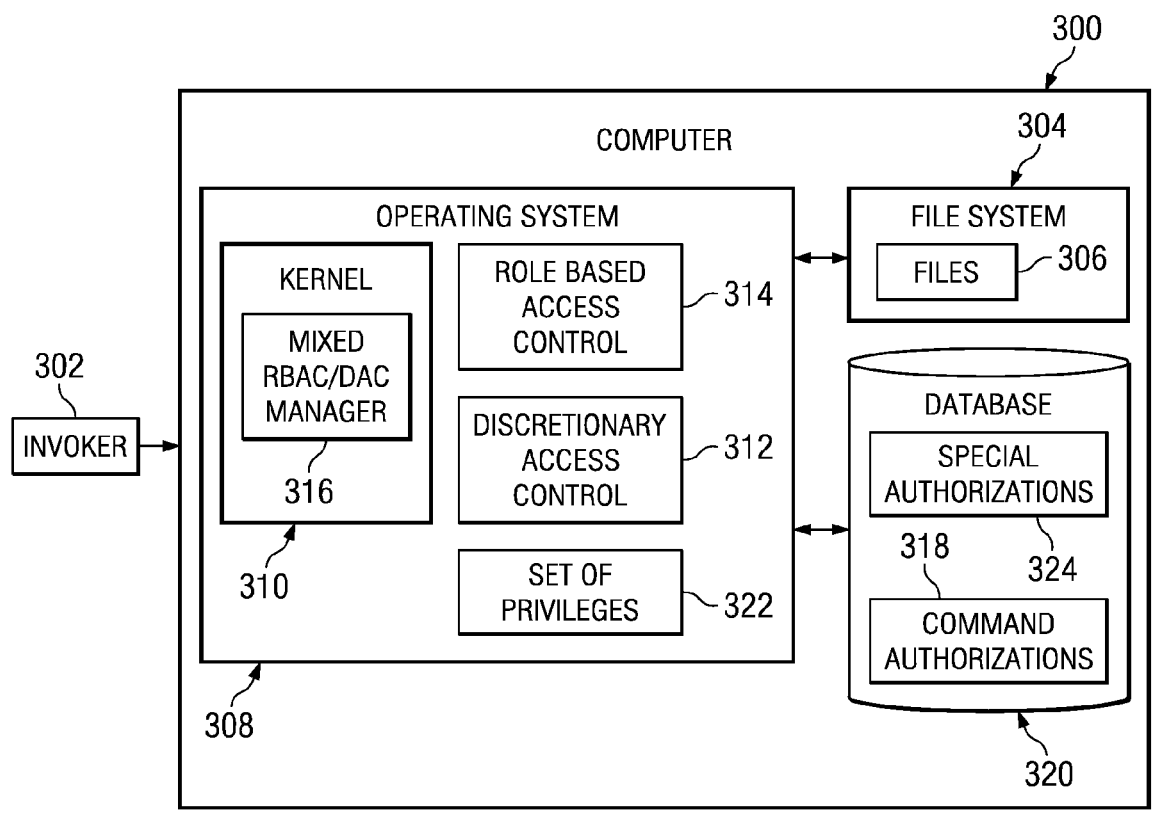
FIG. 3 is a data flow diagram illustrating a dynamic determination of access control checks in a mixed role based access control environment in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Clients 110-112 access files on server 104 and/or 106. Access controls are in place on server 104 and/or 106 to protect files and data associated with files. The illustrative embodiments may also be implemented to apply to files located locally on client 110 in the absence of network 102 and/or servers, such as server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize the need for providing for a mixed role based access control and discretionary access control without changing discretionary access control mode bits. Therefore, the illustrative embodiments provide a computer implemented method, apparatus, and computer usable program code for access control in a mixed discretionary access control and role based access control environment. In one embodiment, execution access for a command is determined using a set of role based authorizations for a user invoking the command.

If a role associated with a set of role based authorizations authorizing execution access for the command is not assigned to the user invoking the command, a determination is made as to whether a special authorization for the command is associated with the user invoking the command. Execution access refers to access or authorization to execute the command invoked by the user. In other words, execution access permits the command to execute. In the absence of execution access, the command or process will be prevented from executing or performing a given operation by the access controls. Execution access is authorized for the command if the special authorization authorizes execution access for the user based on the user's identity.

A special authorization is an authorization authorizing execution access for a command based on the user's identity. The special authorization may be an authorization that authorizes execution access for all users, authorizes execution access for a group of users, or authorizes execution access for an owner of a file associated with the command.

In response to a determination that the user invoking the command is authorized based on the set of role based authorizations and/or the special authorizations, a privilege in a set of privileges assigned to the command is raised.

Raising one or more privileges in the set of privileges bypasses discretionary access control checks without altering the discretionary access control mode bits. In other words, the illustrative embodiments do not require the discretionary access control mode bits to be changed so that all users will have execution access under discretionary access control. Instead, the privileges associated with the command are raised so that discretionary access control will be allowed or permitted under the current discretionary access control mode bit settings. If the user invoking the command is not assigned to a role authorizing execution access for the command and if a special authorization associated with the command is not associated with the user invoking the command, execution access for the command is determined using a set of discretionary access mode bits associated with the command. In this example, execution access is authorized for the command if a discretionary access control mode bit indicates that the user invoking the command has execution access based on the user's identity.

FIG. 3 is a data flow diagram illustrating a dynamic determination of access control checks in a mixed role based access control environment in accordance with an illustrative embodiment. Computer 300 may be implemented using any type of computing device, such as a personal computer, laptop, personal digital assistant, or any other computing device depicted in FIGS. 1 and 2. In these examples, invoker 302 is a process created on behalf of a user attempting to invoke or execute a command on computer 300.

File system 304 is a system for storing and organizing computer files and data for access and retrieval. File system 304 may include a storage device, such as, without limitation, a hard disk, a compact disk read only memory (CD-ROM), a flash memory, or any other data storage device. File system 304 may be implemented as any type of known or available file system. For example, file system 304 may be, but is not limited to, a UNIX® file system (UFS), a second extended file system (EXT2 FS), a third extended file system (EXT3 FS), a file allocation table file system (FAT FS), a new technologies file system (NTFS) or any other known or available type of file system.

In this example, file system 304 is a homogeneous file system. However, file system 304 may also be implemented as a heterogeneous file system. A heterogeneous file system is a file system that includes two or more different types of file systems. For example, a heterogeneous file system could include, without limitation, a UNIX® file system (UFS) and a file allocation table file system (FAT FS).

A file system provides a method for storing and organizing files 306. Files 306 include one or more computer files. A computer file is a piece of data or information stored in file system 304. Invoker 302 executes one or more commands to read or write data to a file in files 306. Invoker 302 may also execute one or more commands to create, move, modify, expand, shrink, execute, and/or delete a file and/or data associated with the file.

Operating system 308 is software on computer 300 for managing hardware and software resources on computer 300. Operating system 308 may be any type of operating system, including, but not limited to, UNIX® operating system, Linux operating system, advanced interactive executive (AIX®) operating system, or any other type of operating system. In this example, operating system 308 is an AIX® operating system.

Operating system 308 includes kernel 310. Kernel 310 is software for managing resources on computer 300, such as processor resources, input and output (I/O) resources, and memory usage. Kernel 310 is an abstraction layer between hardware and software on computer 300.

Discretionary access control (DAC) 312 is an access control environment for restricting access to objects on the identity of invoker 302 and/or one or more groups to which invoker 302 is a member. Role based access control (RBAC) 314 is an access control environment in which access to resources of computer 300, such as files 306 and other resources of file system 304, are restricted to authorized users. In role based access control 314 environment, roles are created for various job functions. Permissions are assigned to each role. Permissions, such as command authorizations 318, are authorizations to execute one or more commands. The commands may be commands for reading data from a file, writing data to a file, creating a file, deleting a file, moving a file, and/or any other command for using, manipulating, executing, or modifying one or more files in files 306. Thus, role based access control 314 assigns permissions to specific operations rather than assigning permissions to data objects as in discretionary access control 312.

Users are assigned to one or more roles. Thus, users obtain rights or authorizations to execute commands associated with one or more files by being assigned to one or more roles that are associated with the appropriate rights or authorizations.

If invoker 302 attempts to execute a command that is authorized by a role assigned to a user associated with invoker 302, the command will be authorized. However, if invoker 302 attempts to execute a command that is unauthorized by any role assigned to the user associated with invoker 302, the command will not be authorized.

Mixed RBAC/DAC manager 316 is a software component for supporting a mixed role based access control and discretionary access control environment without changing discretionary access control mode bits.

Command authorizations 318 are authorizations associated with one or more roles authorizing execution access for users assigned to the role. In other words, if invoker 302 is assigned to a role having a command authorization for write access to a particular file, invoker 302 will be authorized to perform write operations to the particular file based on command authorizations 318 associated with the one or more roles assigned to invoker 302 granting write access to the particular file.

Database 320 is a data storage device for storing authorizations, such as command authorizations 318. Database 320 may be implemented in any type of database for storing data, including, without limitation, a relational database.

In this example, database 320 is a privileged command database storing access authorization set (AAS) field for defining each executable file. To execute a privileged or restricted command, an authorization of invoker 302 must match with the access authorization field regardless of the ownership and permission associated with the file. In other words, the access authorization field indicates if a role based access control restriction is applicable to a given command. If the access control field in database 320 indicates that a role based access control field is applicable, a determination is made as to whether a command authorization associated with a role assigned to invoker 302 grants invoker 302 authorization to execute the command. When authorization is granted to execute the command, the command is given access to a file in files 306 on file system 304. For example, if the command is a process for reading a particular file, when execution of the command is authorized, the command process is given access to the particular file and the reading operation takes place.

Set of privileges 322 are privileges assigned to processes, such as invoker 302, which allow the processes to execute certain privileged or protected programs or processes, and/or access protected or restricted data. Set of privileges 322 are predefined in operating system 308. A process or command may have one or more privileges in set of privileges 322. Mixed RBAC/DAC manager 316 can update or modify set of privileges 322 to add one or more privileges for a given process. The privileges in set of privileges 322 granted to a process can include, but is not limited to, login, read-only, write-only, read and write, execute, file-system access, input/output (I/O), and many more.

In this example, set of privileges 322 includes one or more privileges assigned to invoker 302. Set of privileges 322 allows invoker 302 to execute certain privileged or protected programs or processes, and/or access protected or restricted data.

Mixed RBAC/DAC manager 316 updates set of privileges 322 in response to a determination that invoker 302 is authorized for execution access of an operation or command based on roles assigned to invoker 302 and/or based on one or more special authorizations in special authorizations 324 authorizing access based on the identity of invoker 302.

A special authorization in special authorizations 324 is an authorization associated with role based access control 314 authorizing execution access for a command based on invoker 302's identity rather than based on a role assigned to invoker 302. Special authorizations 324 may be used where a user wants to provide execution access to an owner, group, or all users based on the user's identity in a role based access control environment rather than limiting access based solely on roles assigned to the user. In this manner, the illustrative embodiments can simulate a discretionary access control mechanism for authorizing execution access in a role based access control environment.

Thus, in this illustrative example, during a file execution, mixed RBAC/DAC manager 316 checks command authorizations 318 to determine whether a given command invoked by invoker 302 exists in a privileged command database for role based access control 314, such as database 320. If the command is a privileged command, mixed RBAC/DAC manager 316 verifies that the command is role based access control restricted by checking access authorization for the command.

In one embodiment, access authorization is checked by kernel 310. In this example, kernel 310 looks up a pathname associated with the command in database 320 to check the access authorization.

If the command is role based access control restricted, mixed RBAC/DAC manager 316 determines whether invoker 302 is authorized to execute the command using command authorizations 318 associated with one or more roles assigned to invoker 302. If a match is found between authorizations associated with roles assigned to invoker 302 and the invoked command, then execution is allowed by temporarily raising the privilege of the executing process in set of privileges 322 to bypass the checking of discretionary access control execute bit.

In other words, the privileges in set of privileges 322 are raised so that the process invoked by invoker 302 will have file system access rights when a discretionary access control mode bit is checked. The privileges are raised to bypass the execution checks performed by file system 304. After the point at which file system 304 performs the execution checks, the privileges are lowered. The command can then be executed in file system 304.

After the authorized process has executed in file system 304, the privileges in set of privileges 322 may be restored or lowered back down to their previous state. In this manner, the privileges of the executing process invoked by invoker 302 are temporarily raised to bypass discretionary access control checks.

If the access authorization indicates that the command is not role based access control restricted, then mixed RBAC/DAC manager 316 checks traditional discretionary access control mode bits to determine whether invoker 302 is authorized to execute the command based on the identity of invoker 302. Discretionary access control mode bits may be checked in accordance with any known or available method for checking discretionary access control mode bits.

In this manner, discretionary access control check is bypassed when a file is identified as a role based access control privileged command. A change in discretionary access control mode bits is not required in this example. Therefore, the same file can work for role based access control or with traditional discretionary access control permissions.

In this embodiment in FIG. 3, if a role based access control does not grant authorization to execute the command, discretionary access control mode bits are checked to determine if the command is authorized. However, in another embodiment, if the role based access control does not grant authorization to execute the command, discretionary access control mode bits are not checked. Instead, execution of the command is denied without checking any discretionary access control mode bits.

Figure 4:
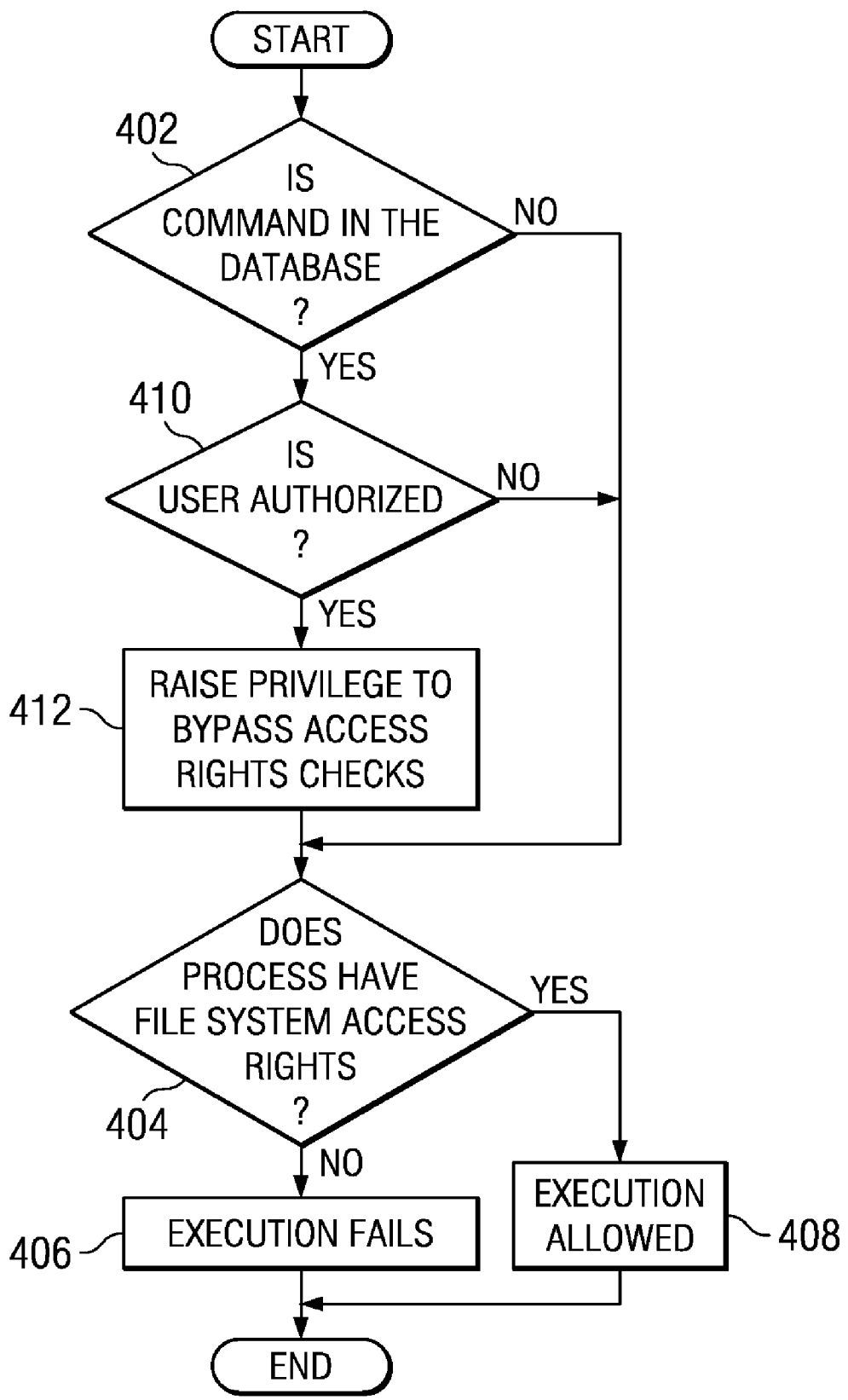
FIG. 4 is a flowchart illustrating a command execution decision in accordance with an illustrative embodiment.

Turning now to FIG. 4, a block diagram illustrating a command execution decision in accordance with an illustrative embodiment. The process illustrated in FIG. 4 may be implemented by software for supporting a mixed role based access control and discretionary access control (RBAC/DAC) environment, such as mixed RBAC/DAC manager 316 in FIG. 3.

The process begins by making a determination as to whether a command invoked by a user is a command associated with a role based access control command authorization in a database (step 402). If the command is not associated with a role based access control command authorization in the database, a determination is made as to whether the command has file system access rights (step 404). A determination is made as to whether the command process has file system access rights by checking discretionary access control mode bits indicating execution authorization for the command.

If the command process does not have file system access rights at step 404, execution of the command process invoked by the user fails (step 406) with the process terminating thereafter. Returning to step 404, if the command process does have file system access rights, execution of the command invoked by the user is allowed (step 408) with the process terminating thereafter.

Returning to step 402, if the command is associated with an authorization in the database, a determination is made as to whether the user is authorized to execute the command (step 410). This determination is made by checking for authorizations, such as command authorizations 318 and/or special authorizations 324 in FIG. 3. The authorizations are authorizations for a role assigned to the user authorizing execution of the command process invoked by the user.

If the user is not authorized at step 410, then a check is made for file system access rights using discretionary access control mode bits (step 404). If the command process has file system access rights, execution of the command invoked by the user is allowed (step 408) with the process terminating thereafter. If the command process does not have file system access rights at step 404, execution of the command process invoked by the user fails (step 406) with the process terminating thereafter.

Returning to step 410, if the user is authorized at step 410, the privileges in a set of privileges for the user are raised to a level that is sufficient to bypass access rights checks (step 412). In other words, the set of privileges is updated or modified to include privileges or authorizations granting file system access rights, such that the command process will be authorized for execution in the discretionary access control mode bits.

Next, the process determines if the command process has file system access rights (step 404). Because privileges in the set of privileges were raised to bypass access rights checks in step 412, the process has file system access rights and execution is allowed (step 408) with the process terminating thereafter.

Thus, in this example, commands which are role based in a role based access control are identified at execution time. If a command is role based access control restricted, the authorizations associated with roles assigned to the invoker will be used to determine execution access. If the command is not role based access control restricted, then the discretionary access control mode bits may be used to determine execution access.

In another embodiment, a user may require that the owner or group who owns a given file still be allowed to execute a given command in a role based access control environment regardless of the roles assigned to the owner or group. Therefore, a mixed RBAC/DAC manager, such as mixed RBAC/DAC manager 316 in FIG. 3 provides a capability to simulate discretionary access control through special authorizations, such as special authorizations 324 in FIG. 3.

In one embodiment, special authorizations includes three types of special access authorizations "allow_owner", "allow_group" and "allow_all". A command access authorization may then be modified to include one or more of these keyword authorizations to grant execution access to the command to the file owner, the group, or all users. The check for whether a user is authorized in step 410 above may be expanded in this example to include a check for authorization keywords and appropriate owner, group, or all verification to authorize execution access to a user based on the user's identity in a role based access control environment regardless of the roles assigned to the user.

Figure 5:
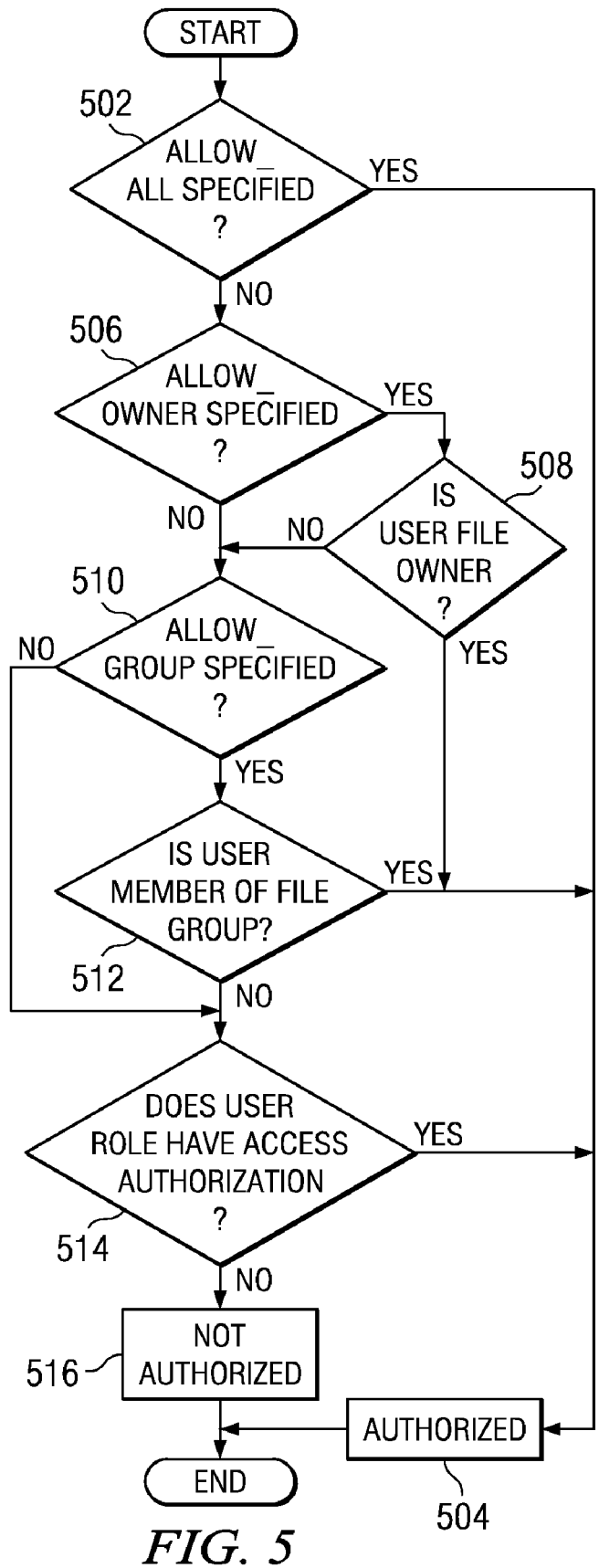
FIG. 5 is a flowchart illustrating a process for a user authorization determination in accordance with an illustrative embodiment.

FIG. 5 is a flowchart illustrating a process for a user authorization determination in accordance with an illustrative embodiment. FIG. 5 is a more detailed description of step 410 in FIG. 4. The process illustrated in FIG. 4 may be implemented by software for supporting a mixed role based access control and discretionary access control (RBAC/DAC) environment, such as mixed RBAC/DAC manager 316 in FIG. 3.

The process begins by making a determination as to whether an allow_all special authorization for a file associated with a command invoked by a user authorizes execution access for all users (step 502). A special authorization may be, for example, an authorization in a mixed role based access control and discretionary access control environment granting access authorization based on an identity of the user, such as special authorizations 324 in FIG. 3. In response to a determination that an allow_all special authorization for the file grants execution access for all users, execution of the command is authorized (step 504) with the process terminating thereafter.

Returning to step 502, responsive to a determination that an allow_all special authorization for the file is not found, the process makes a determination as to whether an allow_owner special authorization grants execution access to an owner of a file associated with the command invoked by the user (step 506). If a determination is made that an allow_owner special authorization is found, a determination is made as to whether the user is the file owner (step 508). If the user is the file owner, execution access for the command is authorized (step 504) with the process terminating thereafter.

If an allow_owner special authorization for the file is not found at step 506 or if the user is not the file owner at step 508, the process makes a determination as to whether an allow_group special authorization grants execution access to all members of a particular group (step 510). If an allow_group special authorization is found, the process makes a determination as to whether the user is a member of the file group (step 512). If the user is a member of the file group, execution access is authorized (step 504) with the process terminating thereafter.

If an allow_group special authorization for the file associated with the command invoked by the user is not found at step 510 or if the user is not a member of the file group at step 512, the process makes a determination as to whether the user is assigned to a role that has access authorization for the command (step 514). If a role having access authorization is not assigned to the user, execution access is not authorized (step 516) with the process terminating thereafter.

Returning to step 514, if a role is assigned to the user that has access authorization for the command, execution access is authorized (step 504) with the process terminating thereafter.

The illustrative embodiments provide a computer implemented method, apparatus, and computer usable program code for access control in a mixed discretionary access control and role based access control environment. In one embodiment, execution access for the command is determined using a set of role based authorizations for a user invoking the command. In response to a determination that the user invoking the command is authorized based on the set of role based authorizations, a privilege in a set of privileges associated with the command is raised. Raising the privilege in the set of privileges bypasses discretionary access control checks without altering the discretionary access control mode bits. In other words, the illustrative embodiments do not require the discretionary access control mode bits to be changed so that all users will have execution access under discretionary access control. Instead, the privileges associated with the command are raised so that discretionary access control will be allowed or permitted under the current discretionary access control mode bit settings.

In response to a determination that the command is not associated with a role based access control restriction, an execution access for the command is determined using a set of discretionary access mode bits associated with the command.

The illustrative embodiments provide the ability to support a mixed role based access control and discretionary access control environment as well as a discretionary access control only environment without modification of discretionary access control mode bits. In addition, the role based access control framework can provide a simulation of discretionary access control by using special authorizations for authorizing execution access of a command based on the invoker's identity rather than solely basing authorizations on roles assigned to the invoker and/or discretionary mode bits.

Thus, the illustrative embodiments are superior to currently known implementations where the embodiments provide a role based access control enforcement without the security risk associated with changing the discretionary access control mode bits on files. Additionally, the embodiments allow for support of discretionary access control only execution environment by simply disabling the role based access authorization check when in discretionary access mode.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for access control in a mixed discretionary access control and role based access control environment, the computer implemented method comprising:

determining an execution access for a command using a set of role based authorizations for a user invoking the command;

responsive to a determination that the user invoking the command is authorized based on the set of role based authorizations, raising a privilege in a set of privileges associated with the command, wherein raising the privilege in the set of privileges bypasses discretionary access control checks;

responsive to a determination that a role associated with the set of role based authorizations authorizing execution access for the command is not assigned to the user invoking the command, determining whether a special authorization is associated with the command, wherein the special authorization is an authorization authorizing execution access for the command based on the user's identity in a role based access control environment; and responsive to a determination that the special authorization does not authorize execution access for the user based on the user's identity, authorizing execution access for the command if a discretionary access control mode bit indicates that the user invoking the command has execution access based on the user's identity.

2. The computer implemented method of claim 1 further comprising:

responsive to a determination that a role associated with the set of role based authorizations authorizing execution access for the command is assigned to the user, granting execution access to the user.

3. The computer implemented method of claim 1 wherein the special authorization is associated with the command, and further comprising:

responsive to a determination that the special authorization is associated with the command, authorizing execution access for the command if the special authorization authorizes execution access for the user based on the user's identity.

4. The computer implemented method of claim 1 wherein the special authorization for the command authorizes execution access for all users.

5. The computer implemented method of claim 1 wherein the special authorization for the command authorizes execution access for a group of users.

6. The computer implemented method of claim 1 wherein the special authorization for the command authorizes execution access for an owner of a file associated with the command.

7. A computer program product comprising:

a non-transitory computer usable storage medium including computer usable program code in a mixed discretionary access control and role based access control environment, said computer program product comprising:

computer usable program code for determining an execution access for a command using a set of role based authorizations for a user invoking the command;

computer usable program code for raising a privilege in a set of privileges associated with the command in response to a determination that the user invoking the command is authorized based on the set of role based authorizations, wherein raising the privilege in the set of privileges bypasses discretionary access control checks;

computer usable program code for determining whether a special authorization is associated with the command in response to a determination that a role associated with the set of role based authorizations authorizing execution access for the command is not assigned to the user invoking the command; and computer usable program code for authorizing execution access for the command if a discretionary access control mode bit indicates that the user invoking the command has execution access based on the user's identity in response to a determination that the special authorization does not authorize execution access for the user based on the user's identity.

8. The computer program product of claim 7 further comprising:

computer usable program code for granting execution access based on the set of authorizations associated with the role assigned to the user in response to a determination that a role having command authorizations for the command is assigned to the user invoking the command.

9. The computer program product of claim 7 wherein a special authorization is associated with the command, and further comprising:

computer usable program code for authorizing execution access for the command if the special authorization authorizes execution access for the user based on the user's identity, wherein the special authorization is an authorization authorizing execution access for the command based on the user's identity in a role based access control environment.

10. The computer program product of claim 7 wherein the special authorization for the command authorizes execution access for all users.

11. The computer program product of claim 7 wherein the special authorization for the command authorizes execution access for a group of users.

12. The computer program product of claim 7 wherein the special authorization for the command authorizes execution access for an owner of a file associated with the command.

13. An apparatus comprising:

a bus system;

a communications system connected to the bus system;

a memory connected to the bus system, wherein the memory includes computer usable program code;

a mixed discretionary access control and role based access control manager code in the memory; and a processing unit connected to the bus system, wherein the processing unit executes the computer usable program code to determine an execution access for a command using a set of role based authorizations for a user invoking the command; raise a privilege in a set of privileges associated with the command, wherein raising the privilege in the set of privileges bypasses discretionary access control checks in response to a determination that the user invoking the command is authorized based on the set of role based authorizations; and authorize execution access for the command if a discretionary access control mode bit indicates that the user invoking the command has execution access based on the user's identity in response to a determination that a special authorization for the command does not authorize execution access for the command based on the user's identity.

14. The apparatus of claim 13 wherein the processor unit further executes the computer usable program code to grant execution access based on the set of authorizations associated with the role assigned to the user in response to a determination that the role having command authorizations for the command is assigned to the user.

15. The apparatus of claim 13 wherein the processor unit further executes the computer usable program code to authorize execution access for the command using a special authorization associated with the command in response to a determination that a role associated with a set of role based authorizations authorizing execution access for the command is not assigned to the user, wherein the special authorization is an authorization authorizing execution access for a command based on the user's identity in a role based access control environment.

\* \* \* \* \*